Nov. 29, 1927.

H. C. EINSTEIN

POSTING MECHANISM

Filed June 23, 1922

1,650,937

6 Sheets-Sheet 1

INVENTOR.
Howard C. Einstein
BY
Day, Oberlin & Day
ATTORNEYS

Nov. 29, 1927.

H. C. EINSTEIN

POSTING MECHANISM

Filed June 23, 1922

1,650,937

6 Sheets-Sheet 3

INVENTOR.
Howard C Einstein
BY
Fay, Oberlin & Fay
ATTORNEYS

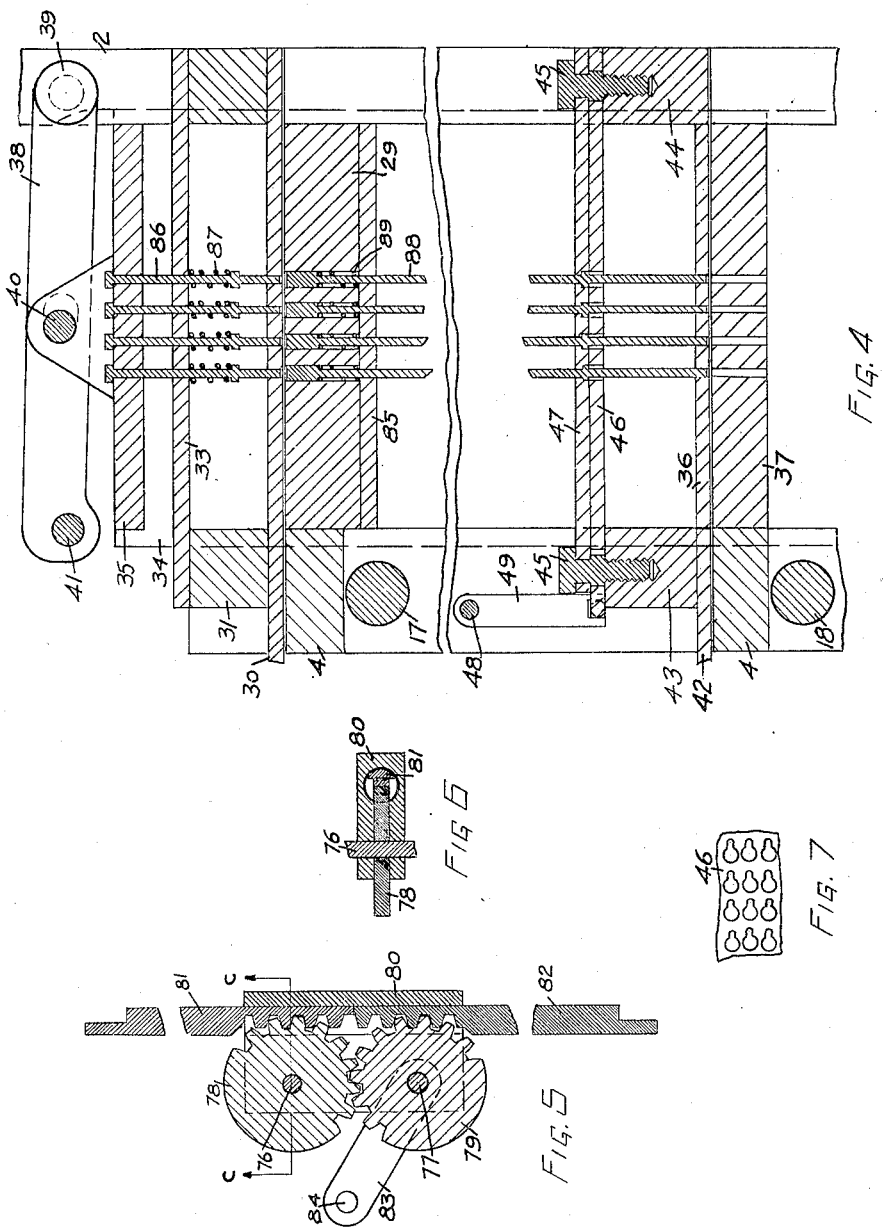

Nov. 29, 1927.

H. C. EINSTEIN 1,650,937

POSTING MECHANISM

Filed June 23, 1922

6 Sheets-Sheet 5

INVENTOR.
Howard C. Einstein
BY
Fay, Oberlin & Fay
ATTORNEYS

Nov. 29, 1927.  1,650,937
H. C. EINSTEIN
POSTING MECHANISM
Filed June 23, 1922  6 Sheets-Sheet 6
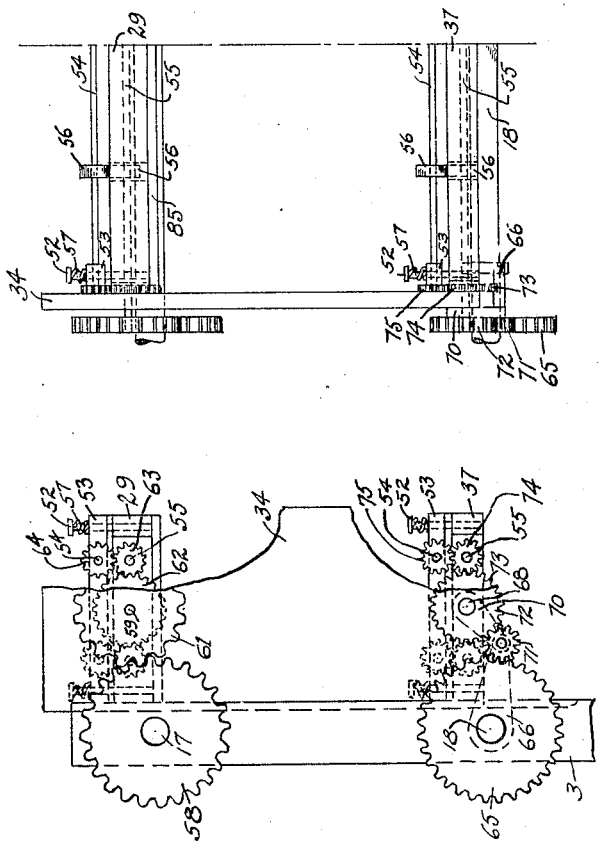
INVENTOR.
Howard C. Einstein
BY Fay, Oberlin + Fay
ATTORNEY.

Patented Nov. 29, 1927.

1,650,937

UNITED STATES PATENT OFFICE.

HOWARD C. EINSTEIN, OF CLEVELAND, OHIO.

POSTING MECHANISM.

Application filed June 23, 1922. Serial No. 570,468.

This invention relates to accounting machines in general, and, in particular, to the perforating machine used in connection therewith for posting data on cards by means of certain perforations.

In essence, it comprises a method whereby certain cards, perforated in a predetermined manner, are used in setting a series of punches to obtain additional cards, similar in perforations, over the range desired, to the original perforated card.

In particular, it comprises a machine whereby certain records, as shown by perforations in a card, arranged in predetermined positions in such a manner as to show these records by virtue of their location and arrangement, may be transferred to other cards; in which the machine is set automatically by the original card and then is adapted to operate on another card to duplicate on the second card, a predetermined number of the perforations in the original card.

In the accompanying drawings:—

Figure 1:
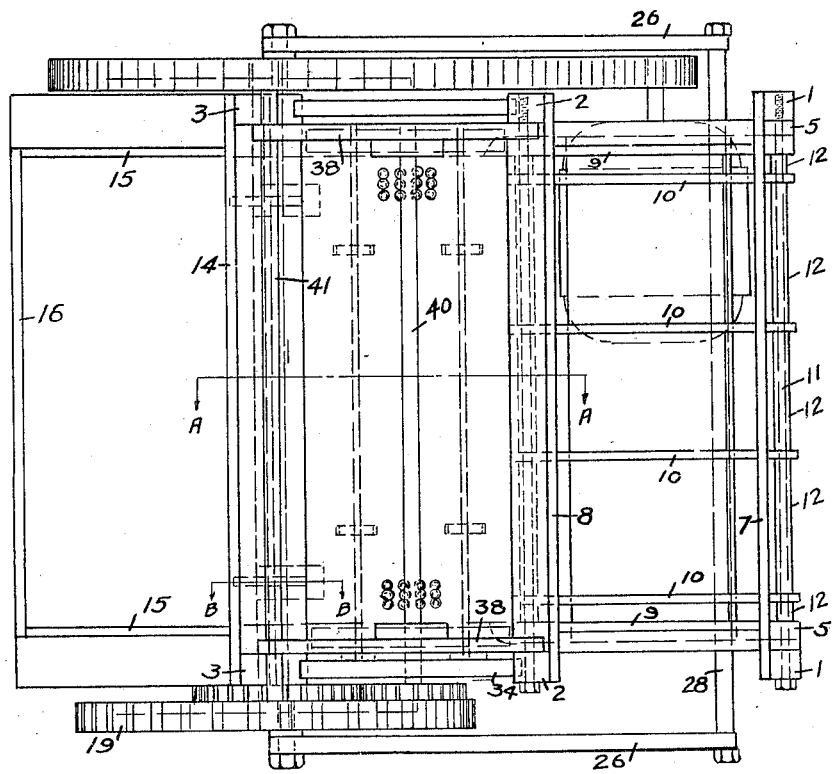
Figure 2:
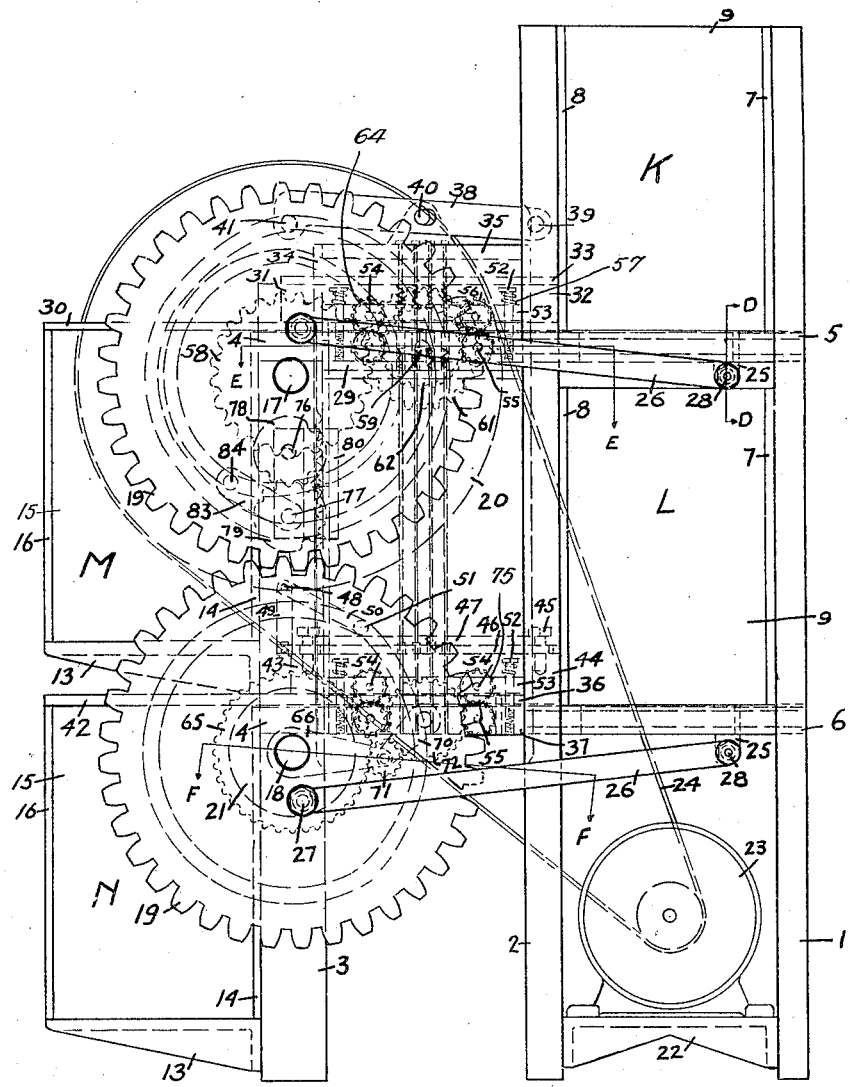
Figure 3:
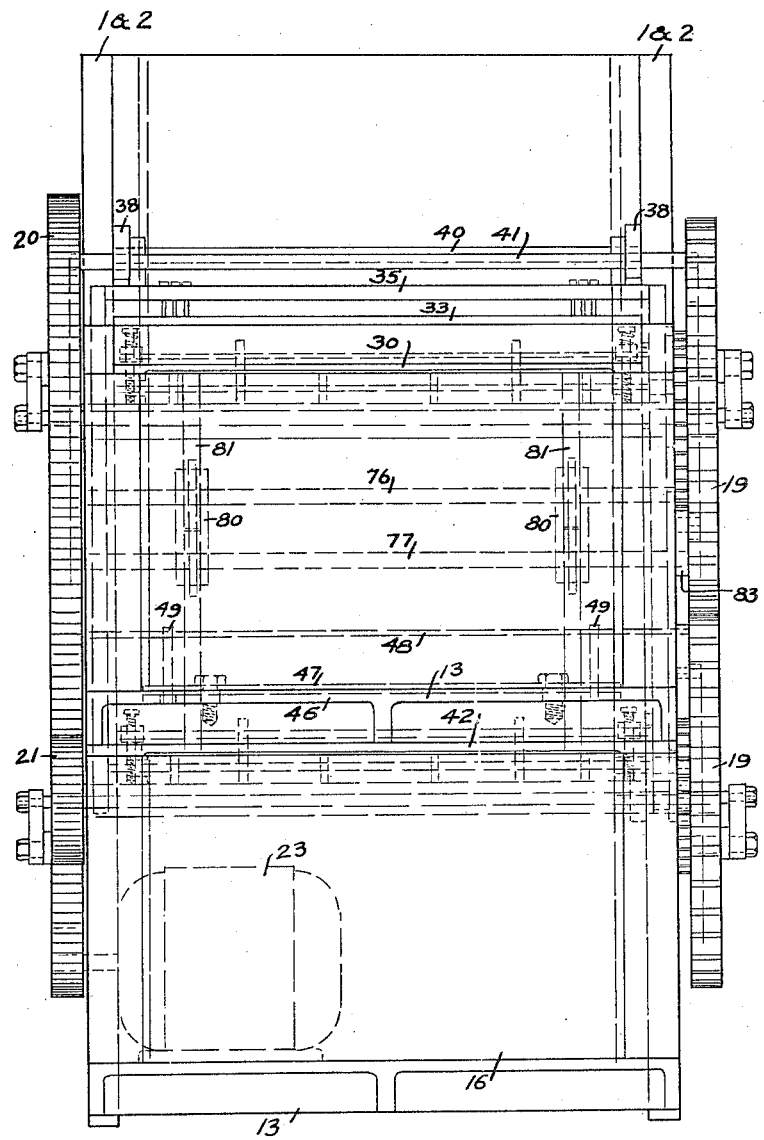
Figure 8:
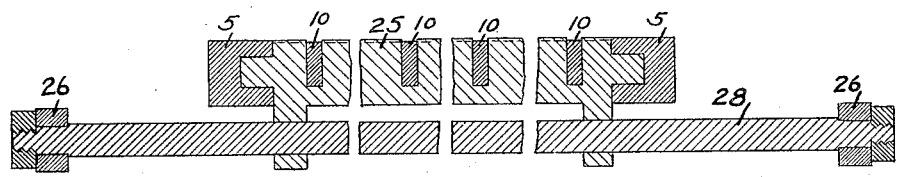
Figure 9:
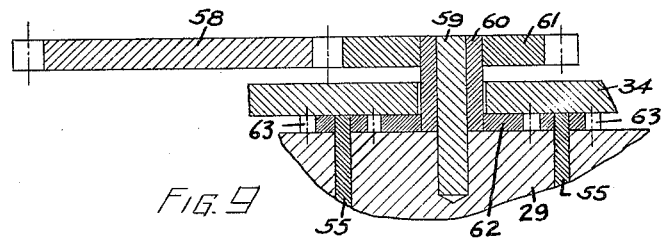
Figure 10:
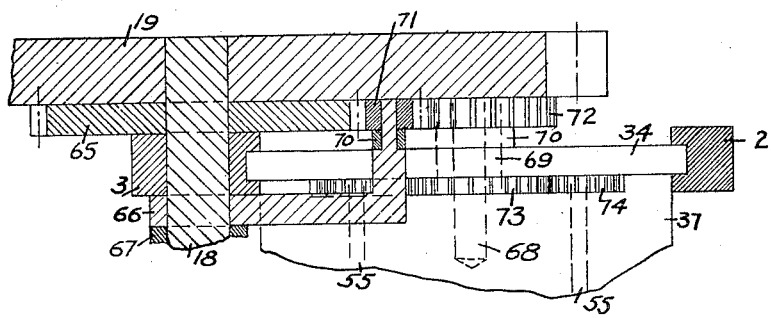

Fig. 1 is a plan view; Fig. 2 is a front elevation; Fig. 3 is a side elevation, taken from the right hand side of Fig. 1; Fig. 4 is a section showing a portion of the details along the line A—A in Fig. 1; Fig. 5 is a section showing the card stop mechanism, taken along the line B—B in Fig. 1; Fig. 6 is a section taken along the line C—C in Fig. 5; Fig. 7 is a fragment of plate 46; Fig. 8 is a section showing the details of the card feeding device, taken along the line D—D in Fig. 2; Fig. 9 is a partial section showing the details of the upper feed gearing, taken along the line E—E in Fig. 2; Fig. 10 is a partial section showing the details of the lower feed gearing taken along the line F—F in Fig. 2; Figs. 11 and 12 are front and side elevations respectively of the feeding and cutting mechanism illustrated in dotted lines in Fig. 2.

The following is a detailed description of the mechanism of the machine.

Referring to Figs. 1, 2, and 3, the machine is supported by three pairs of uprights, 1, 2, and 3. Uprights 3 are fixedly attached to and connected by cross bars, 4. Uprights 1 and 2 are connected in pairs by upper cross head bars 5, which bars are fixedly attached to upper cross bar 4. Uprights 1 and 2 are connected by and fixedly attached to lower cross head bars 6.

Hopper plates 7 are fixedly attached to uprights 1. Hopper plates 8 are fixedly attached to uprights 2. Between hopper plates 7 and 8 are two pairs of hopper plates, 9, fixedly attached thereto. These series of plates 7, 8, and 9 together form two hoppers, K and L, which may be termed the receiving hoppers. Two sets of longitudinal bars, 10, are spaced beneath the upper and lower receiving hoppers, respectively. These are held in place and located by two pairs of connecting pins 11, and the accompanying spacers 12. When placed in the receiving hoppers, the cards rest upon these longitudinal bars.

Fixedly attached to the uprights, 3, are brackets 13 and plates 14. Fixedly attached to brackets 13 and plates 14 are plates 15. Fixedly attached to plates 15 and brackets 13 are plates 16. Brackets 13 and plates 14, 15, and 16 together form two hoppers M and N, which may be termed the discharge hoppers.

Rotatably mounted in uprights 3 are two drive shafts 17 and 18. Gears 19 are fixedly attached to drive shafts 17 and 18 and mesh with each other. Pulley 20 is fixedly mounted on drive shaft 17. Fixedly mounted on drive shaft 18 is disk 21. Bracket 22 is fixedly attached to uprights 1 and 2. Motor 23 is mounted thereon and connected by belt 24 to drive pulley 20.

Cross heads 25 reciprocate in grooved ways in bars 5 and 6, (see Fig. 8). Connecting rods 26 are rotatably mounted on studs 27 which are in turn mounted fixedly to gears 19, and pulley 20 and disk 21. Two cross pins 28 pass through suitably adapted holes in lugs on cross heads 25, permitting free rotation therein. The cross pins are fixedly attached to the two pairs of connecting rods 26. Hence rotation of the gears and pulley will reciprocate the cross heads beneath the cards in the receiving hoppers K and L.

An upper base block 29 is fixedly attached to upper cross head bars 5 and cross bar 4. Plate 30 is fixedly attached to the upper plates 15 and uprights 2 and 3 in a suitable manner to leave space for the passage of one card from the hopper K between it and the base block 29. Cross bars 31 and 32 are fixedly attached between uprights 2 and 3, respectively. Plate 33 is fixedly attached to cross bars 31 and 32.

Uprights 2 and 3 are suitably grooved in pairs, to receive side plates 34, slidably located therein and adapted to reciprocate freely therein. Upper cross plate 35, lower cover plate 36, and lower base block 37 connect this pair of plates 34 and are fixedly attached thereto, thus forming a rigid frame work, adapted to reciprocate with respect to the fixed portions of the machine as desired. This combination is afterwards referred to as the reciprocating frame.

Two lifting arms 38 are rotatably mounted on studs 39, which in turn are fixedly attached to uprights 2. A pin 40 is fixedly attached to two lugs on plate 35 and adapted to reciprocate freely in suitable slots in arms 38. A pin 41 is fixedly mounted in arms 38 as shown. Its ends are adapted to travel in cam paths in the upper gear 19 and pulley 20, respectively.

Lower cover plate 36 is spaced above lower base block 37, a sufficient distance to permit the passage of a card from hopper L between it and the base block. Plate 42 is fixedly attached to lower plates 15 and uprights 3 in a suitable manner to permit the passage of a card between it and lower cross bar 4.

Cross bars 43 and 44 are fixedly attached to the pairs of uprights 3 and 2 respectively; cross bar 44 being suitably spaced to permit the passage of a card between it and the lower longitudinal bars, 10. Studs 45 are fixedly mounted in cross bars 43 and 44. Plate 46 rests on cross bars 44 and 43 and is suitably slotted as to be located by the studs 45 but to be slidably movable from right to left relative to them. Plate 47 is fixedly attached to studs 45.

Shaft 48 is rotatably mounted in uprights 3. Arms 49 are fixedly mounted on shaft 48 and engage in slots in plate 46. Arm 50 is fixedly mounted on shaft 48. Cam stud 51 is fixedly mounted on arm 50 and adapted to travel in a cam path in lower gear 19.

Four studs 52 are fixed in upper base block 29 and four similar studs are fixedly mounted on lower base block 37. Movably mounted on each pair of studs are four roller bars 53. Between each pair of roller bars are two shafts 54 rotatably mounted therein. Rotatably mounted in a similar manner in the respective base blocks 29 and 37 are two similar shafts 55. Fixedly mounted on these pairs of shafts 54 and 55 are eight pairs of rollers 56, so adapted that the cards may pass between each set of rollers respectively, and be gripped thereby. Eight springs 57 mounted on the studs 52 depress the roller bars and keep the upper rollers constantly against the lower ones. Gear 58 is fixedly attached to shaft 17. Stud 59 (see Fig. 9) is fixedly attached to upper base block, 29. Sleeve 60 is rotatably mounted on stud 59. Gear 61 is fixedly mounted on sleeve 60, as is gear 62. Side plate 34 is suitably slotted to permit of its being reciprocated without interference with sleeve 60. Gear 61 meshes with gear 58. Mounted on upper shafts 55 are gears 63 which mesh with gear 62, (see Fig. 9). Mounted on upper shafts 54 are gears 64, which mesh with gears 63. Hence rotation of gear 58 rotates gear 61, thus rotating gear 62 and thence small gears 63 and 64. These drive the roller shafts which feed the cards, as shown.

In the lower feed group, (see Fig. 10) gear 65 is fixedly attached to lower drive shaft 18. Rotatably mounted on shaft 18 is arm 66. Fixedly mounted on shaft 18 is a collar 67 positioned to hold arm 66 in position on shaft 18 while permitting it to oscillate freely. Stud 68 is fixedly mounted on base block 37. Sleeve 69 is rotatably mounted on stud 68. Link 70 is rotatably mounted on sleeve 69 and on arm 66. Gear 71 is rotatably mounted on arm 66 and gear 72, is fixedly mounted on sleeve 69. By this arrangement gear 71 is constantly in mesh with gears 72 and 65. As the framework, of which the lower base block is a part, reciprocates in the machine, arm 70 maintains gear 71 at the correct distance from gear 72 and arm 66 maintains it at the correct distance from gear 65. Thus the rotation of the shaft 18 and gear 65 is constantly driving gear 72, through gear 71, regardless of the position of the reciprocating frame.

Gear 73 is fixedly mounted on sleeve 69 and meshes with gears 74, which are fixedly mounted on lower roller shafts 55. Gears 75 mesh with gears 74 and are fixedly mounted on lower roller shafts 54. Thus rotation of gear 72, driving sleeve 69, drives gear 73 and thence gears 74 and 75, thus constantly driving the lower feed rollers.

Two shafts 76 and 77 are rotatably mounted in uprights 3, (see Figs. 5 and 6), and one pair of gear segments 78 and 79 are mounted on each shaft, respectively. Two frames 80 are mounted on these shafts. A pair of upper stops 81 are slidably mounted in the frames 80 and also in suitable holes in the cross bar 4 and base block 29, being adapted to reciprocate therein. Gear teeth on stops 81 engage in teeth on the corresponding segment 78. Thus a partial rotation of the segments 78 will advance stops 81, bringing their tips across the card path, thus stopping and positioning any card passing along the upper card path. In the same manner, lower stops 82 are mounted in frames 80 and mesh with teeth in segments 79. Arm 83 is fixedly attached to shaft 77. Cam stud 84 is fixedly attached to arm 83 and adapted to oscillate in a cam path in gear 19. Hence, at suitable predetermined intervals, the stops are protruded across the cam path.

Plates 35, 33 and 30 are suitably perforated, (see Fig. 4) to receive reciprocating pins slidably positioned therein. In the drawing is shown a plurality of twenty-four pins for simplicity in demonstrating but the device is adapted to, and arranged for, any number, depending upon the possible perforations in the cards used. Springs 87 act in constant compression between the fixed plate 33 and shoulders on pins 86, tending to depress the pins. They are restrained from depression by shoulders on said pins, resting against plate 35. Beneath each pin is a corresponding plunger 88. These plungers are adapted to reciprocate freely in suitable holes in upper base block 29, plate 85 and plates 47, 46 and 36. Beneath shoulders on plungers 38 are springs 89, in constant compression, tending to lift these plungers, acting against plate 85. Plate 85 is fixedly attached to base block 29. This tendency to rise is restricted by fixed plate 47, against which shoulders on the pins act. Plate 46 is slotted in such a manner (see Fig. 7) that, when plungers 88 are depressed sufficiently to bring the shoulders, normally resting against plate 47, below plate 46, a lateral movement of plate 46 will bring the smaller portion of its corresponding perforation over the shoulder on the plunger, preventing its return.

The following describes the operation of the machine.

A series of what may be termed master cards are placed in the receiving hopper K and a series of cards to be perforated in hopper L. The master cards have in each of them a series of perforations, said perforations being arranged in a predetermined order to present certain facts, these facts being designated by the locations of the respective perforations on the card.

When the motor is started, it drives pulley 20, rotates shaft 17, and through gears 19, drives shaft 18. The motion of the connecting rods 26 reciprocates the cross heads 25 in their respective grooved ways in 5 and 6, below the hoppers K and L. The edges of the cross heads are adapted to project above the longitudinal bars, 10, an amount slightly less than the thickness of one card and to engage the bottom cards in each hopper and to carry them along the card path until said cards are gripped between the first pairs of rollers; after which the cross heads return for the next cards. Rollers 56 being continuously driven, through the chains of gears previously described, grip the cards being fed along the card path and tend to feed them to the discharge hoppers M and N, respectively.

The card stops 81 and 82 are interposed across the paths of the cards at suitable times, holding them in correct positions relative to the base blocks 29 and 37 respectively, during the perforating operation.

The cam paths in upper gear 19 and pulley 20 act on pin 41 at suitable moments to swing arms 38 downward. As the reciprocating frame is suspended from arms 38, it travels accordingly. Cross plate 35 which is part of this reciprocating frame drops down, permitting springs 87 (see Fig. 4) to depress pins 86 against the card on upper base blocks 29. Such pins as correspond with perforations in the upper card pass through said card and depress the plungers 88 beneath them. All other pins are prevented from being depressed by the interference offered by the card.

The lower card is positioned between plates 36 and lower base block 37 and as both of these are part of the reciprocating frame, the card is lowered with them. When the pins reach their lowest position, they are held there momentarily while a cam path in lower gear 19 actuates lever 50, swinging shaft 48 and hence swinging arms 49. These arms move plate 46 laterally. This brings the smaller sections of the holes in plate 46 above the shoulders of these plungers which have been depressed, as above, thus preventing their return under motion of springs 89.

The reciprocating frame is then lifted back to its original position, thus lifting the card on the lower base plate. As plate 46 prevents the depressed plungers from returning, they pierce the card on the lower base plate, in effect duplicating predetermined perforations in the card on the upper plate. After the perforations in the lower card have been made by the plungers, the plate 46 is returned to its original position; thus permitting the springs 89 to lift the depressed plungers back to their original positions.

Meanwhile the lifting of the reciprocating frame has lifted all pins back to their original positions. The stops are withdrawn and the constantly rotating rollers feed the finished cards into the discharge hoppers M and N, respectively and receive the new cards coming from the receiving hoppers K and L. The springs 57 which determine the pressure between the feeding rollers 56 are so adjusted as to permit the rollers to rotate without injury to the card when the card is stopped on the base block.

The drawings show the phase of the operation at the point where the reciprocating frame has just reached the top position; the stop pins have just been withdrawn; hence the cards on the base plates are just released and available for feeding to the discharge hoppers. The cards from the receiving hoppers have already advanced far enough to move onto the base plates, immediately behind the leaving cards.

This invention describes a machine which will duplicate any perforation in any card upon another card; said perforated card being used for the setting of the machine in effecting the duplicated perforation. A mechanical means is described for setting the punches but it is obvious that the scope of the invention is not limited to such means, as the operation may be performed by electrical, fluid, or other means without departing from the present invention.

In application of this machine, two general uses may be outlined of the many which would appear from its use. In the first place, factories using a card accounting system may have master cards made up for different manufactured groups, produced. When it is desired to produce a given group in the shop, duplicate cards may be made up with this machine, using the master cards as standards. These duplicate cards then act as the production orders at different points in the shop for the various parts and operations comprising this group.

In the second place, a method may be devised for keeping a continuous inventory of work in process. In this case, the card containing information regarding a particular production order is a perforated card of the sort used with this and allied machinery. Each perforation in a certain group on this card can be arranged to record the completion of a certain step in the work on the production order. If this perforation appears also in the production order card used in the shop, the machine can be used, with these cards, to record the completion of the operation on the production order. That is, if production order card is received in the planning department when the operation which it represents is completed, the feeding of it through this machine in conjunction with the continuous inventory card will cause certain perforations in the production order card to be duplicated in the continuous inventory card; said perforations being so located as to convey, on the continuous inventory card the fact that this operation is completed. Completion dates or other information may be transferred in this way, at the same time, if desired.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of card receiving means, a card carried therein, said card bearing certain perforations, a series of punches mounted adjacent said perforated card, means for receiving a blank card, means adapted to actuate said blank card in a predetermined direction to permit the setting for operation of certain of said punches arranged in positions corresponding to such perforations in said perforated first card, means to momentarily lock said punches in set position and means adapted upon the return movement of said blank card to cause said set punches to perforate said blank card.

2. In a machine of the character described, the combination of card receiving means, a card carried therein, said card bearing certain perforations, a series of pins mounted adjacent such perforations and spring actuated to pass therethrough, a series of plungers mounted in position to be actuated by said pins when passed through such perforations, means adapted to momentarily lock said actuated plungers, means for receiving a blank card and means adapted to press said blank card against said momentarily locked plungers to perforate the same.

3. In a machine of the character described, the combination of two spaced card conveying means, and means adapted to simultaneously stop cards on said two conveying means in predetermined positions, said means including aligned stops bars movable in opposite directions, and gear means adapted to simultaneously actuate said bars away from each other and into the respective paths of the cards on said two conveying means.

Signed by me, this 21st day of June, 1922.

HOWARD C. EINSTEIN.